(12) United States Patent
Hattori et al.

(10) Patent No.: US 11,133,671 B2
(45) Date of Patent: Sep. 28, 2021

(54) CONTROL DEVICE AND POWER CONVERSION DEVICE

(71) Applicant: TOSHIBA MITSUBISHI-ELECTRIC INDUSTRIAL SYSTEMS CORPORATION, Chuo-ku (JP)

(72) Inventors: Keisuke Hattori, Chuo-ku (JP); Tomohisa Okami, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 17/059,331

(22) PCT Filed: May 31, 2018

(86) PCT No.: PCT/JP2018/020928
§ 371 (c)(1),
(2) Date: Nov. 27, 2020

(87) PCT Pub. No.: WO2019/229921
PCT Pub. Date: Dec. 5, 2019

(65) Prior Publication Data
US 2021/0167596 A1  Jun. 3, 2021

(51) Int. Cl.
*H02J 1/04* (2006.01)
*H02J 1/14* (2006.01)

(52) U.S. Cl.
CPC . *H02J 1/04* (2013.01); *H02J 1/14* (2013.01)

(58) Field of Classification Search
None
See application file for complete search history.

(56) References Cited

U.S. PATENT DOCUMENTS

| 2004/0245783 A1* | 12/2004 | Gilbreth | H02J 1/10 290/52 |
| 2018/0210477 A1* | 7/2018 | Romanov | G05F 1/575 |
| 2020/0295563 A1* | 9/2020 | Lu | H02J 1/082 |

FOREIGN PATENT DOCUMENTS

JP  2016-152733 A  8/2016

OTHER PUBLICATIONS

International Search Report dated Aug. 14, 2018 in PCT/JP2018/020928 filed on May 31, 2018, citing document AO therein, 1 page.

\* cited by examiner

*Primary Examiner* — Jared Fureman
*Assistant Examiner* — Joel Barnett
(74) *Attorney, Agent, or Firm* — Oblon, McClelland, Maier & Neustadt, L.L.P.

(57) ABSTRACT

According to an embodiment of the invention, a control device is provided and controls a power converter that can be connected to a terminal of a direct current power transmission system transmitting power according to a current command value that is set. The control device includes a first characteristic setter having a first characteristic preset. When the power converter is set at a power transmission end of the direct current power transmission system, the first characteristic outputs an output terminal voltage for the power converter. The output terminal voltage corresponds to a current of a current control based on a current command value set at a power receiving end of the direct current power transmission system. The output terminal voltage of the first characteristic monotonously decreasing with respect to the current of the current control.

7 Claims, 7 Drawing Sheets

FIG. 8

CONTROL DEVICE AND POWER CONVERSION DEVICE

TECHNICAL FIELD

An embodiment of the invention relates to a control device and a power conversion device.

BACKGROUND ART

In a direct current power transmission system that includes two terminals, for example, a power conversion device that is connected to one terminal of the two terminals receives an input of a power command value supplied from a higher-level system, generates a current command value (Idp) based on the power command value, and performs a constant power control (APR), etc. A power conversion device that is connected to the other terminal receives data of the current command value Idp generated by the one terminal via a communication line. Thus, the direct current power transmission system correctly functions because the same current command value Idp is input to the power conversion devices of the two terminals at an appropriate timing.

Transmission data that is missing, delayed, etc., may cause a fault in the operation of the direct current power transmission system. Therefore, it is necessary for the terminal-terminal communication to be high-quality and highly reliable. To communicate with high quality and high reliability, it is necessary to lay a dedicated communication line, install dedicated communication devices, etc.; and there is a tendency for the cost burden to become large.

Even when high-quality highly reliable terminal-terminal communication is realized, it is difficult to completely eliminate communication faults; therefore, the power conversion devices of the terminals include operation modes that are independent of the terminal-terminal communication. However, in an operation mode that is independent of the terminal-terminal communication, the direct current power transmission system has controllability constraints, system-operation constraints, etc. Therefore, it is assumed that such an operation mode should only be used as a backup.

CITATION LIST

Patent Literature

Patent Literature 1: JP-A 2016-152733 (Kokai)

SUMMARY OF INVENTION

Technical Problem

Embodiments of the invention provide a control device, and a power conversion device including the control device; the control device controls a power converter that is connected to a direct current power transmission system and can operate without using terminal-terminal communication.

Solution to Problem

According to an embodiment of the invention, a control device is provided and controls a power converter that can be connected to a terminal of a direct current power transmission system transmitting power according to a current command value that is set. The control device includes a first characteristic setter having a first characteristic preset. When the power converter is set at a power transmission end of the direct current power transmission system, the first characteristic outputs an output terminal voltage for the power converter. The output terminal voltage corresponds to a current of a current control based on a current command value set at a power receiving end of the direct current power transmission system. The output terminal voltage of the first characteristic monotonously decreasing with respect to the current of the current control.

Effects of the Invention

According to embodiments of the invention, a direct current power transmission system that can be operated without using terminal-terminal communication can be constructed.

DESCRIPTION OF EMBODIMENTS

Various embodiments are described below with reference to the accompanying drawings.

The drawings are schematic and conceptual; and the relationship between the thickness and width of the portions, the proportions of sizes among portions, etc., are not necessarily the same as the actual values. Also, the dimensions and proportions may be illustrated differently among drawings, even when the same portion is illustrated.

In the specification and drawings, components similar to those described previously or illustrated in an antecedent drawing are marked with the same reference numerals, and a detailed description is omitted as appropriate.

Figure 1:
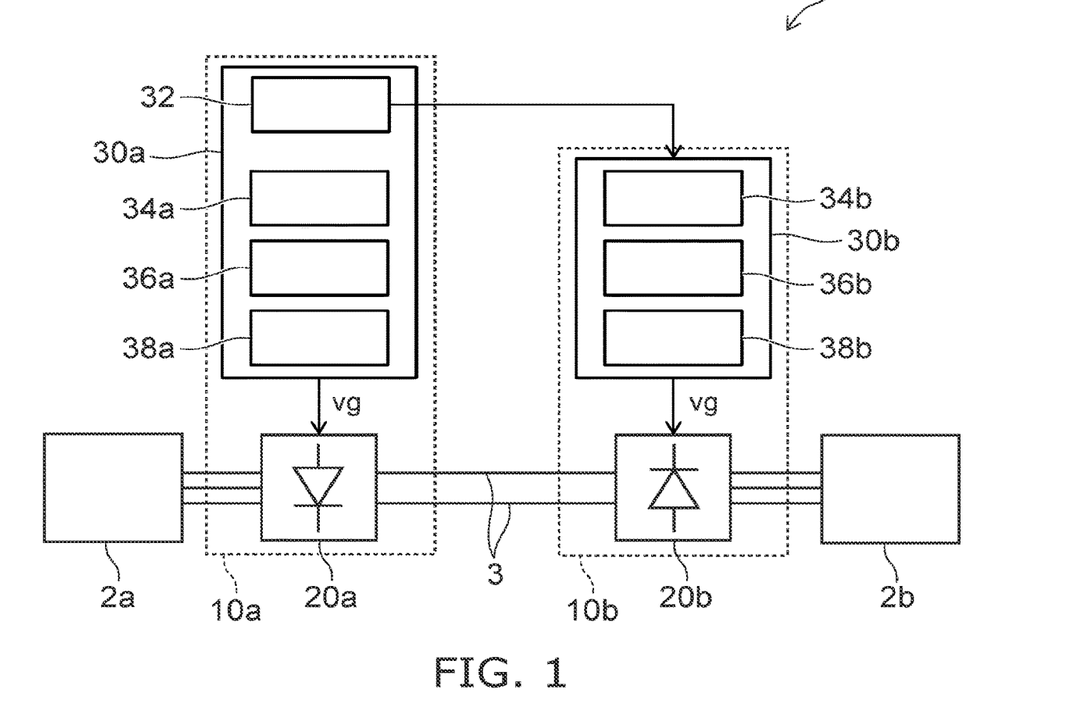
FIG. 1 is a block diagram illustrating a power conversion device according to an embodiment.

FIG. 1 is a block diagram illustrating a power conversion device according to an embodiment.

The configuration of a direct current power transmission system also is shown in FIG. 1. As shown in FIG. 1, the direct current power transmission system 1 includes two power conversion devices 10a and 10b and a direct current power line 3. The power conversion device 10a is connected between the direct current power line 3 and an alternating current circuit 2a. The power conversion device 10b is connected between an alternating current circuit 2b and the direct current power line 3. For example, the alternating current circuits 2a and 2b each can have configurations including an alternating current power supply, an alternating current power line, an alternating current load, etc., of 50 Hz or 60 Hz. The alternating current circuits 2a and 2b can be different power systems.

The direct current power transmission system 1 can transmit bidirectional direct current power. The connection terminals of the power conversion devices 10a and 10b can be a power transmission end that transmits direct current power or can be a power receiving end that receives direct current power. When the connection terminal of one power conversion device 10a is a power transmission end, the connection terminal of the other power conversion device 10b is a power receiving end. When the connection terminal of the other power conversion device 10b is a power transmission end, the connection terminal of the one power conversion device 10a is a power receiving end. The power conversion devices 10a and 10b have the same configuration, and the configuration of the power conversion device 10a is described below. Components 20b to 38b of the power conversion device 10b are respectively the same as components 20a to 38b of the power conversion device 10a, and a description is omitted as appropriate.

Although the direct current power transmission system 1 that includes two terminals is described hereinbelow, the power conversion device is applicable to a multi-terminal direct current power transmission system including three or more terminals.

The power conversion device 10a includes the power converter 20a and the control device 30a. The power converter 20a converts an alternating current voltage into a direct current voltage and outputs the direct current voltage according to a gate signal vg generated by the control device 30a. The power converter 20a is a separately-excited power converter and is, for example, a thyristor valve.

The control device 30a generates the gate signal vg based on a direct current voltage Vd and a direct current Id and supplies the generated gate signal vg to the power converter 20a.

The control device 30a includes the current command value setter 34a, the direct current voltage controller 36a, and the direct current controller 38a. The control device 30a selects and operates one of the current command value setter 34a or the direct current controller 38a automatically or as appropriate. When the power conversion device 10a is the power transmission end, the current command value setter 34a is selected; when the power conversion device 10a is the power receiving end, the direct current controller 38a is selected.

The direct current controller 38a operates to track the direct current command value Idp when the power conversion device 10a is the power receiving end and the direct current command value Idp is set.

When the power conversion device 10a becomes the power receiving end due to power flow reversal, the direct current voltage controller 36a temporarily performs a voltage control operation that operates to finalize the operating point.

Figure 2:
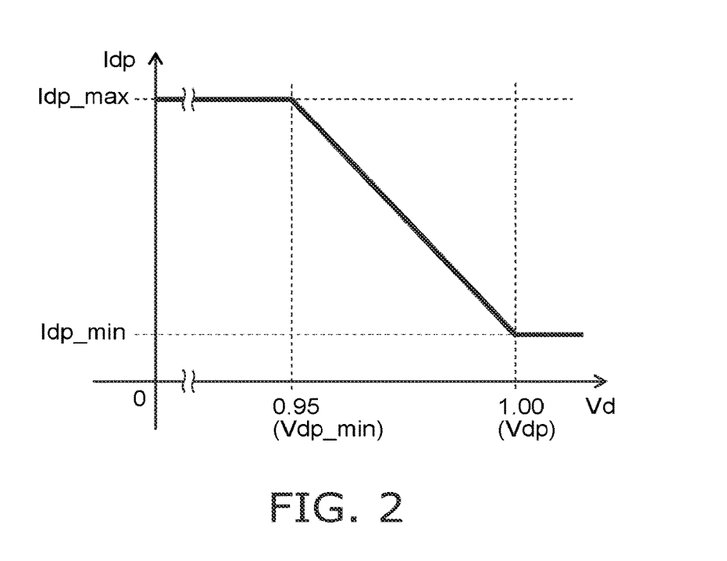
FIG. 2 is a graph illustrating a characteristic of the power conversion device of FIG. 1.

FIG. 2 is a graph illustrating a characteristic of the power conversion device of FIG. 1.

The graph of FIG. 2 is an example of the characteristic output by the current command value setter 34a.

As shown in FIG. 2, the current command value setter 34a includes data of it's own direct current terminal voltage Vd with respect to the data of the current command value Idp. The range Idp_min to Idp_max of the current command value Idp is the range of the current command values that may be set by the direct current power transmission system 1. Favorably, the range of the current command value Idp matches the setting range of the current command value of the direct current power transmission system 1.

The direct current terminal voltage Vd is set to monotonously decrease within a prescribed range with respect to the current command value Idp. The monotonously-decreasing range is, for example, from 95% of the rated voltage to the rated voltage. Favorably, the maximum value of the range of the direct current terminal voltage Vd is the rated voltage because the power transmission efficiency is high when the direct current terminal voltage of the power transmission end is the rated voltage, which is the maximum voltage when operating.

Although the direct current terminal voltage Vd favorably has a linear characteristic with respect to the current command value Idp, the characteristic may not be linear as long as the characteristic monotonously decreases.

For example, the current command value setter 34a stores the data of the direct current terminal voltage Vd with respect to the current command value Idp in a table format. The current command value setter 34a may store the current command value Idp as a function relating to the direct current terminal voltage Vd.

The direct current voltage controller (AVR) 36a is selected after releasing the characteristic set by the current command value setter 34a in a power flow reversal, which is elaborated below. In the case of a power flow reversal of the power conversion device 10a from the power transmission end to the power receiving end, the power conversion device 10a controls the reversed direct current voltage by the AVR 36a by setting the current command value Idp to the minimum value. Subsequently, the power conversion device 10a transitions to a current control operation.

When the power conversion device 10a is the power receiving end, the direct current controller (ACR) 38a operates to track the current command value Idp generated based on the power command value supplied from the higher-level system. The power command value that is supplied from the higher-level system is used as the current command value Idp by the current command value generator 32.

The current command value generator 32 may be provided in the control device 30a or provided at the higher-level system side; the control device 30a may be configured to set the current command value Idp from the higher-level system.

The ACR 38a is selected when the characteristic set by the current command value setter 34a of the power flow reversal is released. The ACR 38a is selected by a power flow reversal signal; for example, the ACR 38a sets the current command value Idp to the minimum value Idp_min.

Although not illustrated, the control devices 30a and 30b each include margin angle control functions when the power converters 20a and 20b are thyristor valves. The margin angle control function limits the direct current terminal voltage Vd when the direct current Id flowing through the direct current power line 3 is large and the control angle is large.

Operations of the power conversion device of the embodiment will now be described.

First, the determination operation of the operating point between the power transmission end and the power receiving end will be described.

Figure 3A:
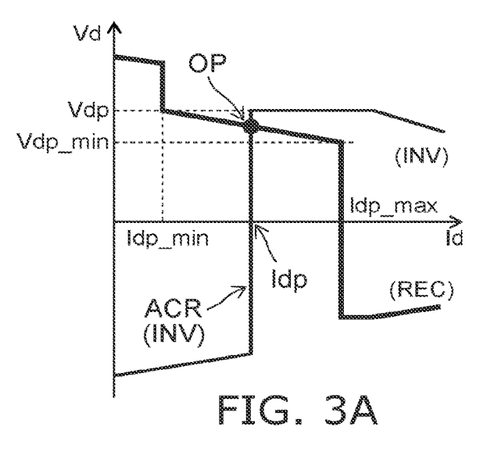
FIGS. 3A to 3C are graphs for describing an operation of the power conversion devices of the embodiment.
Figure 3B:
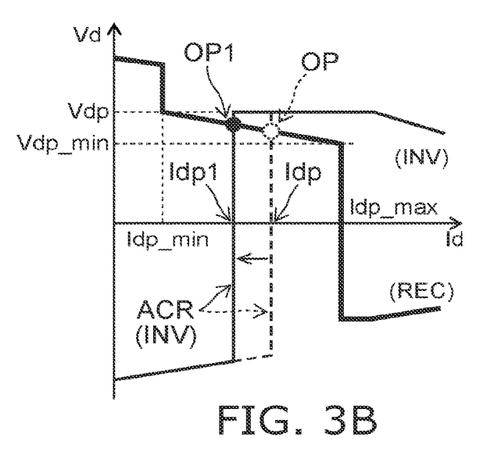
Figure 3C:
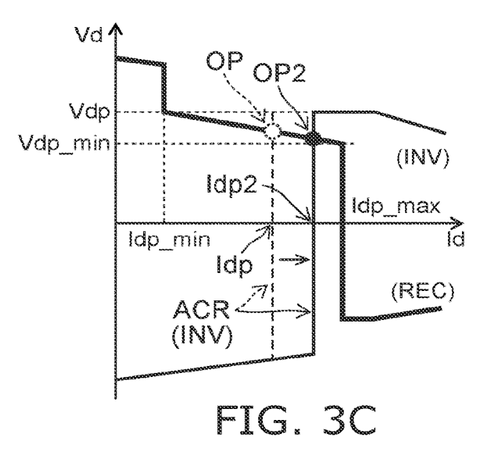

FIGS. 3A to 3C are graphs for describing an operation of the power conversion devices of the embodiment.

In the figures of FIGS. 3A to 3C, the horizontal axis is the direct current Id flowing in the direct current power line 3, and the vertical axis is the direct current terminal voltage Vd of the power conversion devices 10a and 10b. The power conversion devices 10a and 10b output a positive direct current terminal voltage Vd when the direct current terminal voltage Vd is positive. The power conversion devices 10a and 10b output a negative direct current terminal voltage −Vd when the direct current terminal voltage Vd is negative. The direct current terminal voltage Vd has opposite signs between the power transmission end and power receiving end of the direct current power transmission system 1. Hereinbelow, the Vd-Id characteristic is called the output characteristic for the power conversion devices or the power transmission end and the power receiving end.

In FIGS. 3A to 3C, the power conversion device 10a is at the power transmission end, and the power conversion device 10b is at the power receiving end. As shown in FIGS. 3A to 3C, the power conversion device 10b of the power receiving end outputs a negative direct current terminal voltage −Vd when the power conversion device 10a of the power transmission end outputs a positive direct current terminal voltage Vd. The output characteristic of the power transmission end is a thick solid line illustrated by (REC), and the output characteristic of the power receiving end is a thin solid line illustrated by (INV).

As shown in FIG. 3A, an operating point OP of the direct current power transmission system 1 is the point where the output characteristic of the power transmission end and the output characteristic of the power receiving end intersect. At the power receiving end, the power conversion device 10b operates in a current control mode (an ACR mode) set with the current command value Idp. The operation of the ACR mode is illustrated by ACR(INV) in the figure. At this time, the current command value Idp is within the setting range Idp_min to Idp_max of the current command value.

In the power conversion device 10a at the power transmission end, the current command value setter 34a is selected because the current command value Idp is within the range set by the current command value setter 34a, and the direct current terminal voltage Vd is uniquely determined for the direct current Id that is current-controlled to the current command value Idp.

When the current command value Idp is set to Idp1 that is less than Idp of FIG. 3A, the operating point OP moves to an operating point OP1 as in FIG. 3B. This condition is described in detail as follows.

When the current command value Idp that is provided to the power receiving end is set to Idp1 that is less than Idp, the current command value Idp1<Id temporarily occurs. Therefore, Id is controlled toward Idp1 by the direct current control of the power receiving end, and Id decreases. At the power transmission end, Idp1>Id occurs due to the decrease of Id; the phase of the control angle of the power transmission end is advanced by the ACR 38a; and Vd increases. The decrease of Id and the increase of Vd continue until reaching the next operating point OP1 that is determined by the ACR characteristic of the power transmission end and the Idp-Vd characteristic of the power transmission end. When the decrease of Id and the increase of Vd reach the next operating point OP1, Id and Vd again have stable operations. For example, such behavior is similar even when Vd temporarily decreases or Id temporarily increases due to a disturbance, etc.

When the current command value Idp is set to Idp2 that is greater than the case of FIG. 3A, the operating point OP moves to an operating point OP2 as in FIG. 3C. This condition is described in detail as follows.

The direct current Id is controlled toward a current command value Idp2 by the direct current controller 38b of the power conversion device 10b of the power receiving end, and the direct current Id increases. In the power conversion device 10a of the power transmission end, Idp2<Id occurs due to the increase of the direct current Id; a control angle α of the power transmission end is lagged by a direct current control, and the direct current terminal voltage Vd decreases. The increase of Id and the decrease of Vd continue until reaching the next operating point OP2 that is determined by the characteristic of the ACR 38b of the power conversion device 10b of the power receiving end and the characteristic of the current command value setter 34a of the power conversion device 10a of the power transmission end. The increase of Id and the decrease of Vd again are stable when the next operating point OP2 is reached. Such behavior is similar even when Vd temporarily increases or Id temporarily decreases due to a disturbance, etc.

Thus, in the embodiment, if the current command value Idp is set in the power conversion device 10b of the power receiving end, the operating point is automatically determined without the power conversion device 10a of the power transmission end receiving the set current command value Idp via a communication line, etc.

An operation when the power transmission end and the power receiving end are interchanged by a power flow reversal will now be described with reference to FIG. 4 and FIGS. 5A to 5D. In the description hereinbelow, the power transmission end and the power receiving end will be interchanged; therefore, the terminal to which the power conversion device 10a is connected is called the A-terminal, and the terminal to which the power conversion device 10b is connected is called the B-terminal. In the figures of the output characteristics, the output characteristic of the A-terminal is illustrated by a thick solid line, and the output characteristic of the B-terminal is illustrated by a thin solid line.

Figure 4:
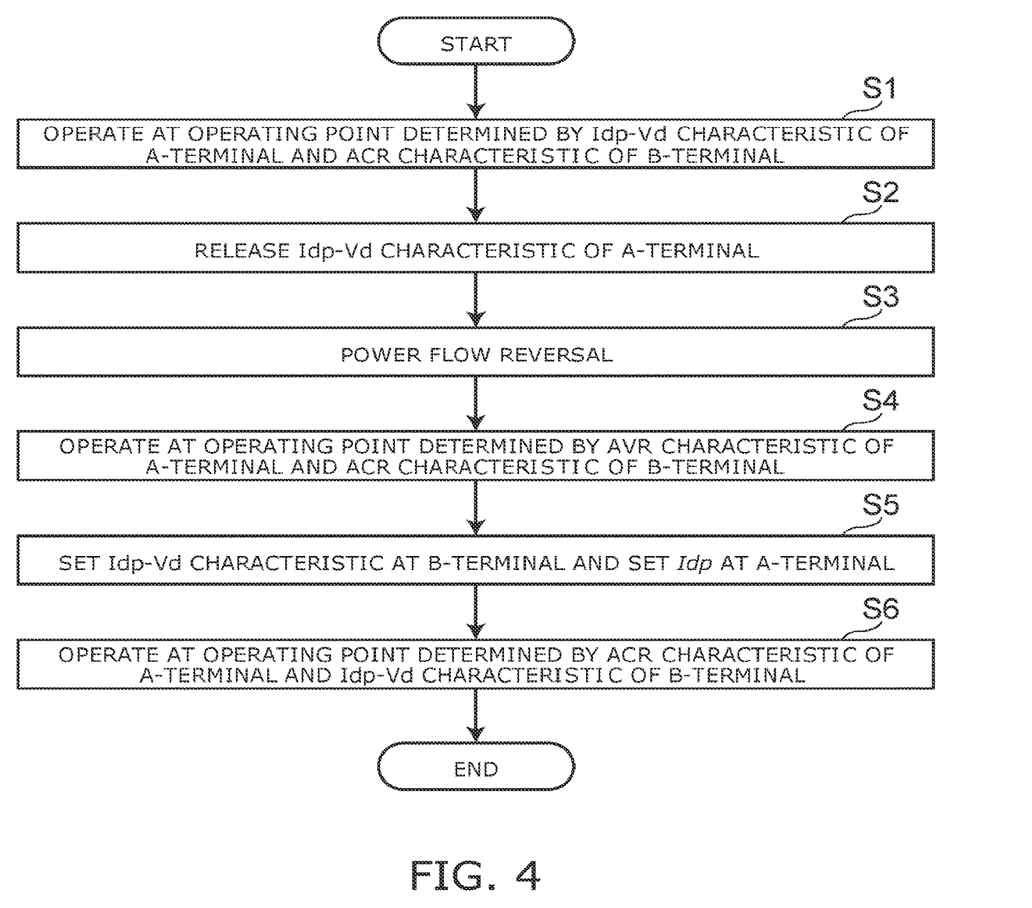
FIG. 4 is an example of a flowchart for describing an operation of the power conversion devices of the embodiment.

FIG. 4 is an example of a flowchart for describing an operation of the power conversion devices of the embodiment.

FIGS. 5A to 5D are graphs for describing an operation of the power conversion devices of the embodiment.

In step S1 as shown in FIG. 4, the power conversion device 10b of the B-terminal receives the supply of the current command value Idp from the higher-level system and performs an ACR operation to track the current command value Idp. The power conversion device 10a of the A-terminal operates at the operating point OP determined by the Idp-Vd characteristic of the current command value setter 34a.

Figure 5A:
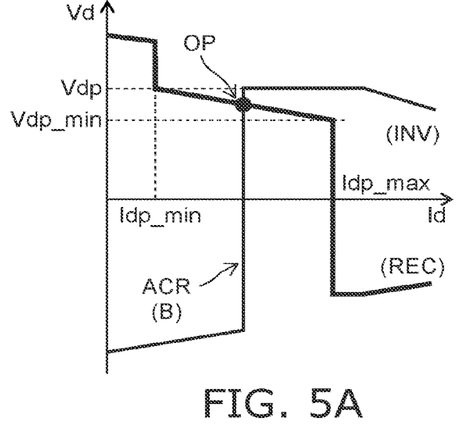
FIGS. 5A to 5D are graphs for describing an operation of the power conversion devices of the embodiment.

The state of step S1 is as shown in FIG. 5A. The state of FIG. 5A is the same as the operation already elaborated in FIG. 3A.

In step S2, the power conversion device 10a of the A-terminal receives a power flow reversal command from the higher-level system and releases the Idp-Vd characteristic.

Figure 5B:
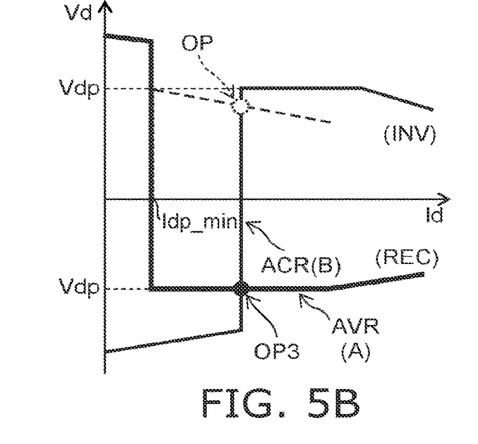

Specifically, as shown in FIG. 5B, according to the power flow reversal command, the power conversion device 10a transitions to the ACR operation and sets the current command value Idp of the ACR operation to the minimum value Idp_min. At this time, the power conversion device 10b continues the ACR operation. The direct current terminal voltage Vd of the power conversion device 10a reverses (step S3), and the operating point transitions to OP3 determined by the ACR characteristic of the B-terminal and the AVR characteristic of the A-terminal illustrated by AVR(A).

In step S4, the power conversion device 10b receives a current command value after the power flow reversal.

Figure 5C:
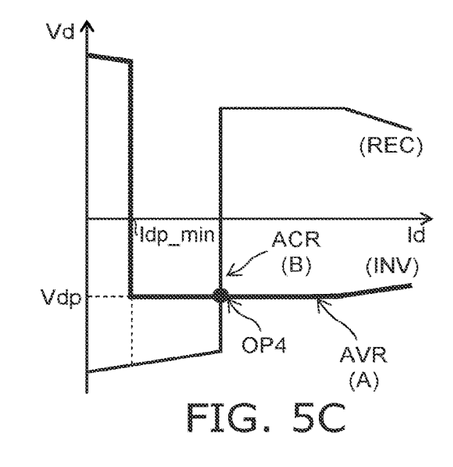

The power conversion device 10a operates with the AVR characteristic illustrated by AVR(A) of FIG. 5C, and the power conversion device 10b operates with the ACR characteristic illustrated by ACR(B). An operating point OP4 is determined by the AVR characteristic illustrated by AVR(A) and the ACR characteristic illustrated by ACR(B).

In the power conversion device 10b in step S5, the Idp-Vd characteristic is set by the current command value setter 34b. The Idp-Vd characteristic of the power conversion device 10b may be the same as or different from the Idp-Vd characteristic of the power conversion device 10a.

Figure 5D:
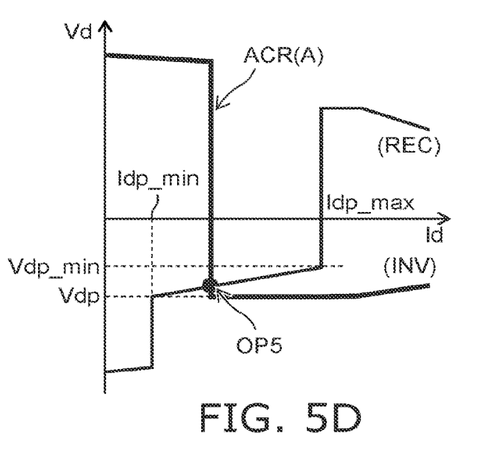

As shown in FIG. 5D, in the power conversion device 10a, the power conversion device 10a of the A-terminal operates with the ACR characteristic illustrated by ACR(A), and the power conversion device 10b of the B-terminal operates with the Idp-Vd characteristic. An operating point OP5 is determined by these characteristics (step S6).

Thus, the power conversion devices 10a and 10b of the embodiment can perform the power flow reversal operation.

Figures 6A, 6B:
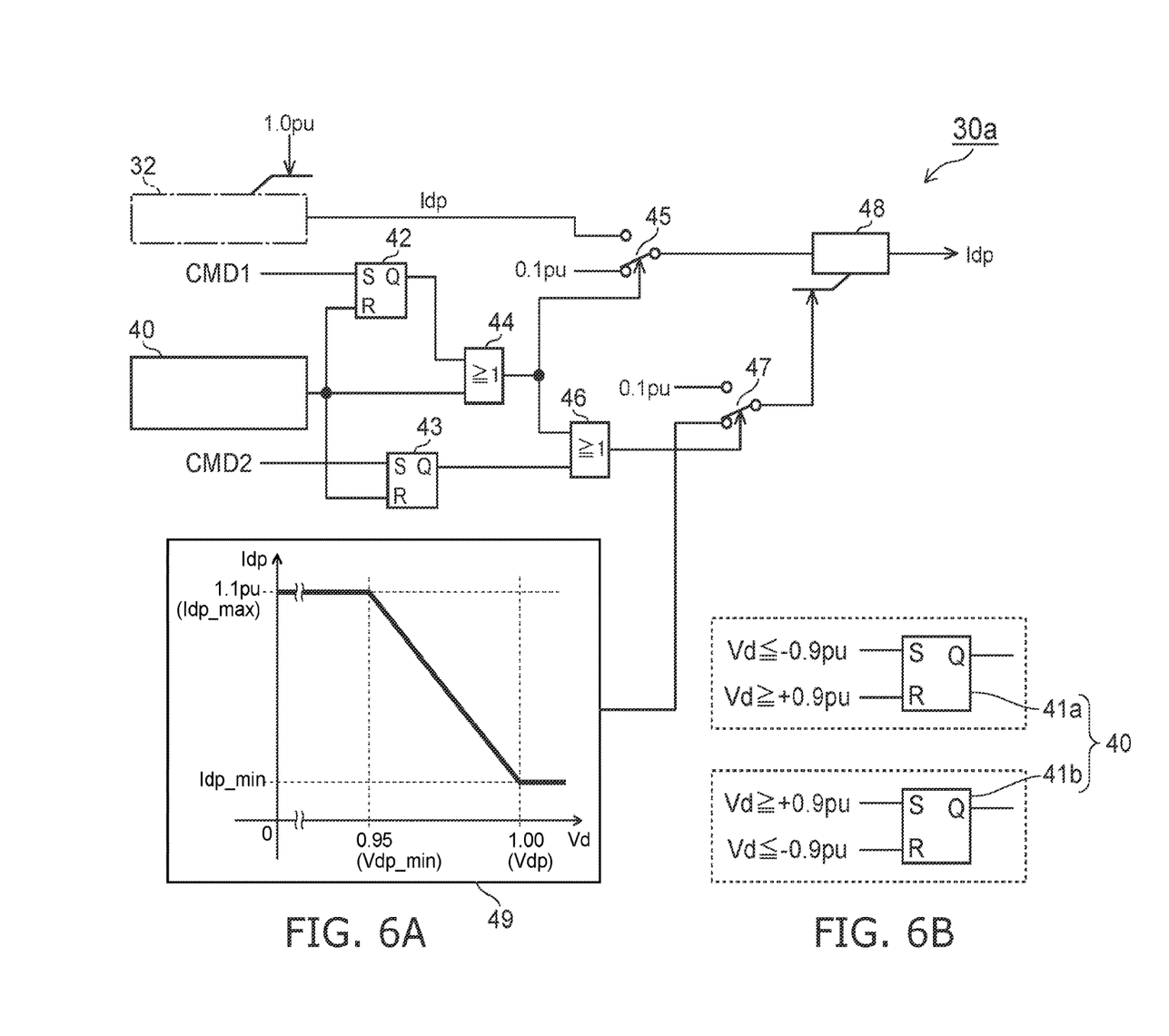
FIGS. 6A and 6B are block diagrams illustrating a portion of the control device of the power conversion device of the embodiment.

FIGS. 6A and 6B are block diagrams illustrating a portion of the control device of the power conversion device of the embodiment.

By appropriately setting a logic circuit, the power conversion devices 10a and 10b of the embodiment can automatically startup and perform the power flow reversal operation without installing a high-quality highly reliable communication line. Such a logic circuit can be provided for each of the control devices 30a and 30b.

As shown in FIGS. 6A and 6B, the control device 30a includes flip-flops 40, 42, and 43, comparators 44 and 46, switchers 45 and 47, an outputter 48, and an Idp setter 49. The control device 30a includes the current command value generator 32. The current command value generator 32 supplies the data of the current command value Idp to one input of the switcher 45.

In the example, the flip-flops 40, 42, and 43 are RS flip-flops. The flip-flop 40 includes, for example, two flip-flops 41a and 41b; one of the two flip-flops 41a and 41b is selected according to whether the power conversion device 10a is the power transmission end or the power receiving end. In the example, the flip-flop 41b is selected when the power conversion device 10a is the power transmission end, and the flip-flop 41a is selected when the power conversion device 10b is the power receiving end. The output of the flip-flop 40 is connected to reset inputs R of the flip-flops 42 and 43.

A startup command CMD1 is input to a set input S of the flip-flop 42. The startup command CMD1 is input when the power conversion device 10a is the power receiving end. A power flow reversal command CMD2 is input to a set input S of the flip-flop 43.

The outputs of the flip-flops 42 and 40 each are connected to inputs of the comparator 44. The comparator 44 selects and outputs the flip-flop 42 or 40 that outputs "1". The output of the comparator 44 supplies a switch signal to the switcher 45.

The output of the comparator 44 and the output of the flip-flop 43 are connected to inputs of the other comparator 46. The comparator 46 selects and outputs the output of the comparator 44 or the output of the flip-flop 43 that outputs "1". The output of the comparator 46 supplies a switch signal to the switcher 47.

The switcher 45 switches between two inputs and supplies a signal that is input to the outputter 48. The data of the current command value Idp from the current command value generator 32 is supplied to one input of the switcher 45. A fixed value of the current command value is set to the other input of the switcher 45. In the example, the minimum value Idp_min=0.1 pu of the current command value is set as the fixed value of the current command value.

The switcher 45 supplies the data of either input to the outputter 48 according to the switch signal supplied from the comparator 44. When the switch signal is "1", the switcher 45 supplies, to the outputter 48, the data of the current command value Idp output from the current command value generator 32. When the switch signal is "0", the switcher 45 supplies 0.1 pu, which is the fixed value, to the outputter 48.

The switcher 47 sets the limit value of the signal of the outputter 48 by switching between two inputs. The outputter 48 limits the output to the limit value corresponding to the output of the switcher 47.

When the switch signal is "1", the switcher 47 supplies 0.1 pu, which is the fixed value, as a limit value to the outputter 48. When the switch signal is "0", the switcher 45 supplies the data of Idp output from the Idp setter 49 as a limit value to the outputter 48.

The Idp setter 49 sets Idp for Vd. In the example, Idp has the maximum value Idp_max when the minimum value Vd_min of the direct current terminal voltage Vd is 95% of a rated value Vdp, and the value at this time is 1.1 pu. Idp has the minimum value Idp_min when the direct current terminal voltage Vd is the rated value Vdp.

An operation of the logic circuit will now be described.

First, the startup procedure will be described.

The startup sequence starts by inputting the startup command CMD1 to the power receiving end. At this time, Vd starts to increase (or decrease) from 0.0 pu; therefore, the current command value Idp of the power transmission end is set to Idp_max according to the Idp-Vd characteristic of the Idp setter 49. Idp_max is set to a value that is greater than the upper limit of Idp that can be input to the power receiving end by the Idp setter 49. For example, Idp_max is set to 1.1 pu when a maximum of 1.0 pu is provided to the power receiving end as Idp.

As a result, at the startup, the relationship of the magnitude of Idp of the power transmission end> the magnitude of Idp of the power receiving end is maintained. Therefore, the direct current voltage polarities of the power conversion devices 10a and 10b are finalized, and Vd increases (decreases). When Vd reaches 0.9 pu (or −0.9 pu), the flip-flop 40 that sets the Vd condition of the INV end is set; therefore, the startup command CMD1 is reset. When Vd reaches the value determined by the Idp-Vd characteristic of the power conversion device 10a of the power transmission end, the normal operating state is reached in which Id and Vd are controlled by the ACR characteristic of the power receiving end and the Idp-Vd characteristic of the power transmission end.

The procedure of the power flow reversal will now be described.

The power flow reversal sequence is started by inputting the power flow reversal command CMD2 to the power conversion device 10a of the power transmission end. The power flow reversal command CMD2 may be input by a manual operation at the power transmission end or may be transmitted from the power conversion device 10b of the power receiving end that includes the current command value generator 32b. When the power flow reversal command CMD2 is transmitted from the power conversion device 10b of the power receiving end, it is unnecessary to synchronize the power flow reversal command CMD2 between the power transmission end and the power receiving end. Therefore, it is not always necessary to use a high-quality communication for the transmission of the commands and/or the data between the two terminals.

The transition of the power flow reversal operation from the INV end to the REC end may be transmitted based on a condition of the direct current Id. For example, the power flow reversal command CMD2 may be detected at the power transmission end by Id falling below 0.15 pu, etc. In such a case, terminal-terminal communication is not used at all.

By any of these methods, when the power flow reversal command CMD2 is received or detected at the power transmission end (the A-terminal), the Idp-Vd characteristic of the A-terminal is released, and Idp of the A-terminal is set to Idp_min (=0.1 pu) that is set beforehand. As described in FIG. 4 and FIGS. 5A to 5D, the power flow reversal operation is started, and the polarity of Vd reverses.

After the polarity reversal of Vd, Vd further decreases (or increases), and the flip-flop 40 that sets the Vd condition of the A-terminal is set when Vd reaches −0.9 pu (or 0.9 pu). Then, the power flow reversal command CMD2 is reset, and Idp is set by the current command value generator 32a in the power conversion device 10a of the A-terminal.

At this time, in the power conversion device 10b of the B-terminal as well, the polarity of Vd reverses; therefore, the flip-flop 40 that sets the Vd condition of the B-terminal when Vd reaches −0.9 pu (or 0.9 pu) is reset, and Idp of the power conversion device 10b of the B-terminal is set according to the Idp-Vd characteristic.

When Vd reaches the value determined by the Idp-Vd characteristic of the power conversion device 10b of the B-terminal, the normal operating state is reached in which Id and Vd are controlled by the ACR characteristic of the power conversion device 10a of the A-terminal and the Idp-Vd characteristic of the power conversion device 10b of the B-terminal.

Thus, in the power conversion devices 10a and 10b of the embodiment, one of the devices can autonomously startup due to the startup command CMD1 and can automatically perform the power flow reversal operation due to the power flow reversal command CMD2 without using a high-quality highly reliable communication line.

The components of the power conversion device including the control device described above may be realized by an arithmetic device including a CPU (Central Processing Unit), an MPU (Micro Processing Unit), etc. Some or all of the components described above may be realized by being sequentially executed by a program stored in a memory device connected to the arithmetic device.

Effects of the power conversion devices 10a and 10b of the embodiment will now be described while comparing to a power conversion device of a comparative example.

Figure 7A:
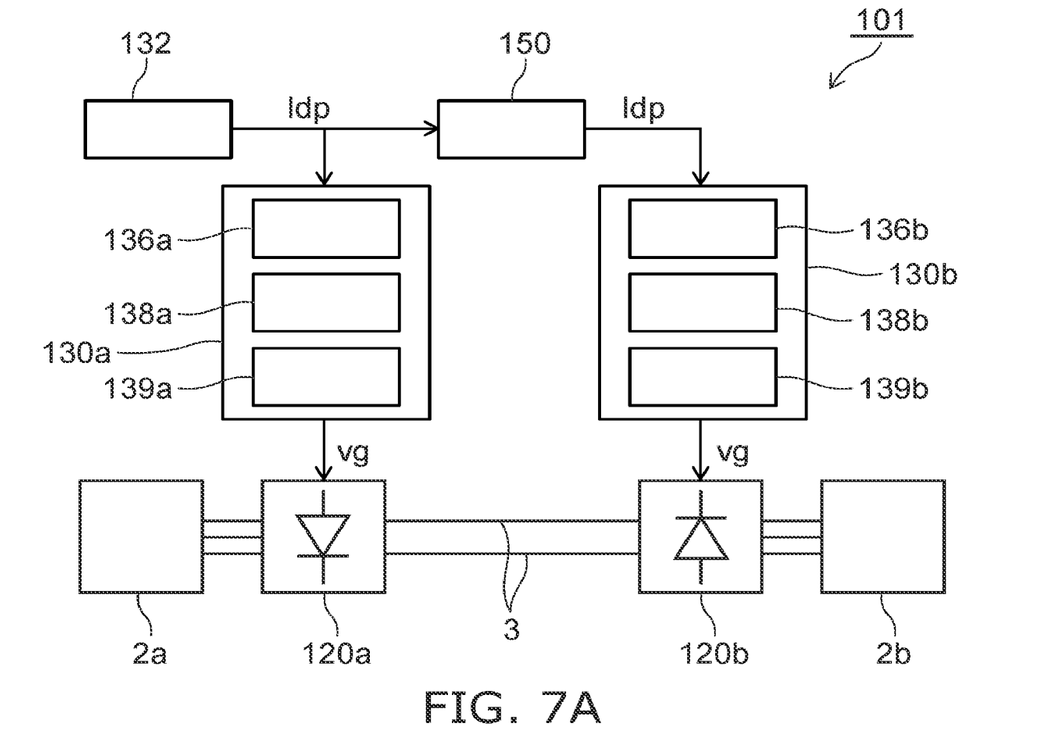
FIG. 7A is a block diagram illustrating the power conversion device of the comparative example.
Figure 7B:
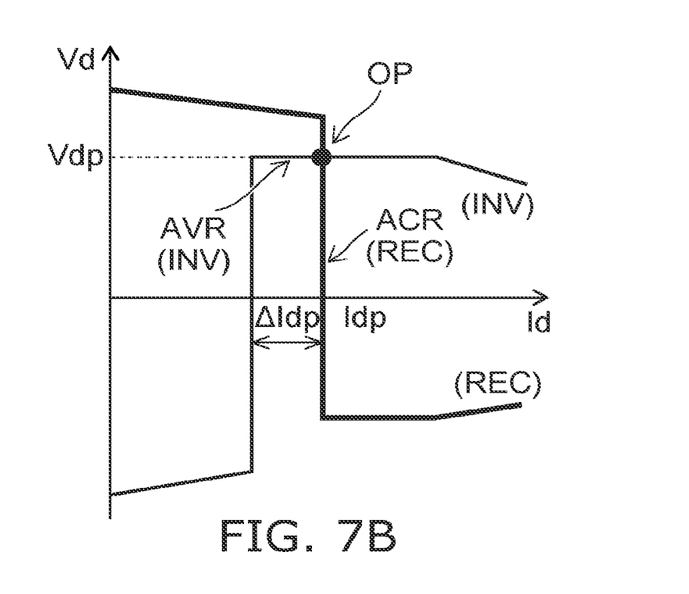
FIG. 7B is a graph for describing an operation of the power conversion device of FIG. 7A.

FIG. 7A is a block diagram illustrating the power conversion device of the comparative example. FIG. 7B is a graph for describing an operation of the power conversion device of FIG. 7A.

As shown in FIG. 7A, the direct current power transmission system 101 includes power converters 120a and 120b and control devices 130a and 130b.

The power converter 120a is connected between the alternating current circuit 2a and the direct current power line 3. The power converter 120b is connected between the direct current power line 3 and the alternating current circuit 2b.

The control device 130a includes a constant voltage controller (AVR) 136a and a constant current controller (ACR) 138a. The control device 130a includes a margin angle controller 139a. The AVRs 136a and 136b, the ACRs 138a and 138b, and the margin angle controllers 139a and 139b are the same components between the control devices 130a and 130b; the control device 130a will now be described.

In the control device 130a, similarly to the control device 30a of the power conversion device 10a of the embodiment, the direct current terminal voltage Vd and the direct current Id are input, and the gate signal vg is generated so that the direct current terminal voltage Vd and the direct current Id track the voltage command value and the current command value.

As shown in FIG. 7B, the control device 130a of the power transmission end performs the ACR operation of causing the direct current Id to track the current command value Idp according to the current command value Idp that is supplied. This is illustrated by ACR(REC) in the figure.

The control device 130b of the power receiving end receives the data of the current command value Idp via a communication line 150. The ACR part 138b of the control device 130b sets the ACR characteristic to a current (Idp-ΔIdp) that is a current margin ΔIdp amount subtracted from the current command value Idp.

An operating point OPc is determined by the AVR characteristic (AVR(INV)) of the power transmission end and the ACR characteristic (ACR(REC)) of the power receiving end.

Thus, the current command value Idp that is generated by a current command value generator 132 is transmitted to the power receiving end by using the communication line 150 for the terminal-terminal communication, and the same Idp is shared by the two ends. Also, other than the current command value Idp, the power flow reversal or startup/stop timing are synchronized by transferring a flow direction signal or a startup/stop command between the two terminals.

In the direct current power transmission system 101 of the comparative example, the power transmission and/or the power flow reversal are not appropriately performed when the data of the current command value Idp is transmitted with a large delay between the two terminals or when the data from one is missing.

In the comparative example, the terminal-terminal communication is used in the signal transfer of the current command value Idp, the flow direction command, the startup/stop command, etc., between the two ends; therefore, there is a possibility that a delay of the terminal-terminal communication may affect the stability of the control and/or the abnormal operation of the power flow reversal sequence or the startup/stop sequence. Therefore, high quality and high reliability of the terminal-terminal communication are necessary. High-quality highly reliable communication refers to being high-speed and having little effect of the communication amount on the communication speed. When a dedicated line is laid between the two ends to realize high-quality highly reliable communication, there are many cases where the installation cost increases, the operating cost of the dedicated line increases, and the maintenance cost of the dedicated line increases.

In the control device 130a of the comparative example, there are cases where a technique of continuing the power transmission is used regardless of the terminal-terminal communication when the terminal-terminal communication is disconnected.

Figure 8:
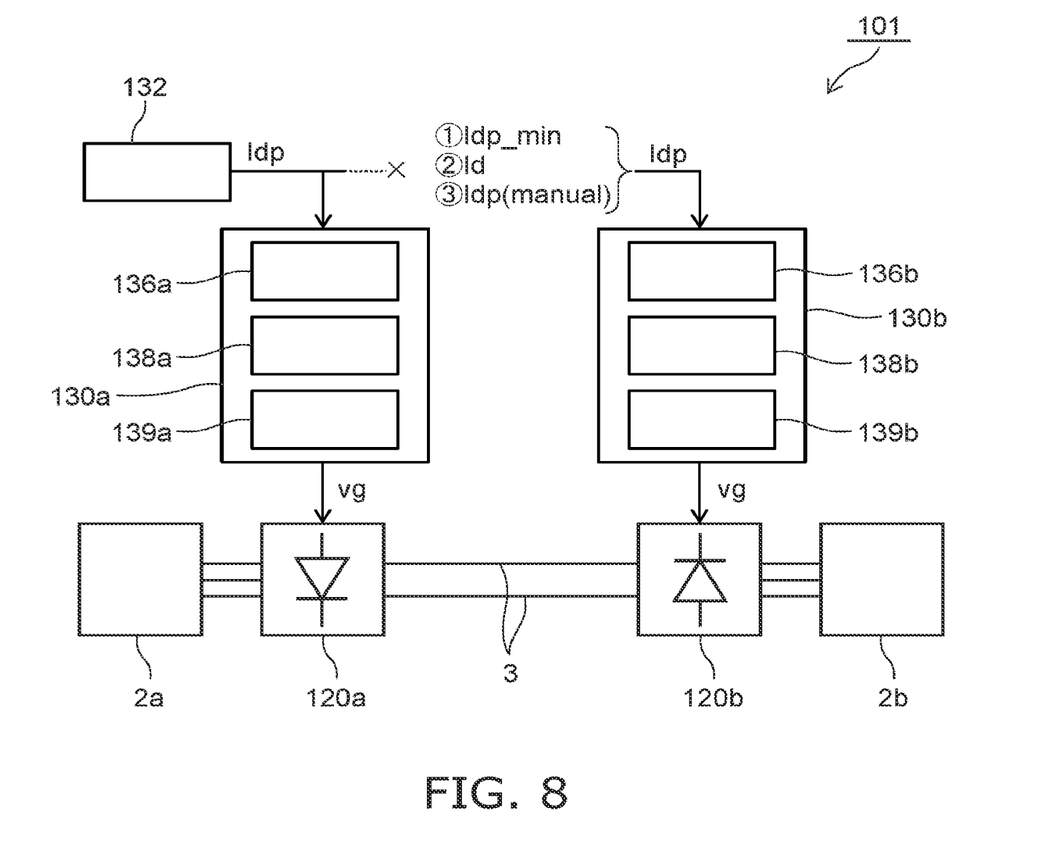
FIG. 8 is a block diagram for describing the operation when communication is disconnected in the power conversion device of the comparative example.

FIG. 8 is a block diagram for describing the operation when communication is disconnected in the power conversion device of the comparative example.

When communication is disconnected as shown in FIG. 8, there are cases where a setting to the minimum value Idp_min of the current command value Idp is forcibly performed in the power receiving end. In a first technique in the control device 130b of the power receiving end, the operating point can be uniquely determined by setting the current of the ACR characteristic to Idp_min when the reception of the current command value Idp stops. However, in this technique, the direct current that can be transmitted is undesirably limited to Idp_min, and the desired power cannot be transmitted.

In a second technique, there are cases where the direct current Id that is detected at the power receiving end is set to the current command value when the reception of the current command value Idp stops. However, for the ACR selection mode of the power receiving end, the command value of the direct current Id to be controlled by the ACR of the power receiving end is (Id-ΔIdp), and similarly to the case described above, the direct current is controlled to (Idp_min-ΔIdp).

In a third technique, there are cases where an operator that operates the control device 130a is located at the power transmission end side and an operator that operates the control device 130b is located at the power receiving end side, and the current command value Idp is manually set by the operators using another communicator such as a telephone, etc. However, in this technique, it is necessary to constantly provide an operator at each terminal in preparation for an abnormality of the terminal-terminal communication, and a realistic operation is difficult.

In the first and second techniques described above, it is difficult to perform the power flow reversal because Idp of the power receiving end cannot be set to the desired value. Accordingly, the first and second techniques also must be utilized on the premise of being a backup when an abnormality of the terminal-terminal communication occurs.

The power conversion devices 10a and 10b of the embodiment include the control devices 30a and 30b that include the current command value setters 34a and 34b. The current command value setters 34a and 34b set the values of their own direct current terminal voltages Vd with respect to the current command value Idp. The Idp-Vd characteristic is set so that Vd monotonously decreases with respect to Idp. Therefore, in the Idp-Vd characteristics of the current command value setters 34a and 34b, Vd is uniquely determined by setting Idp. Accordingly, even without setting the current command value Idp at both the power transmission end and the power receiving end, the operating point is stably set because Vd of the power conversion device 10a of the power transmission end is determined according to Idp set by the ACR characteristic of the power conversion device 10b of the power receiving end. Because the operating point is set by the desired current command value Idp, the desired power transmission can be performed even when the terminal-terminal communication is disconnected.

In the power conversion devices 10a and 10b of the embodiment, the power flow reversal can be easily performed by releasing the Idp-Vd characteristic of the power conversion device 10a of the power transmission end. Continuing, a stable operating point can be set in the power flow reversal state by setting the Idp-Vd characteristic in the power conversion device 10b of the power receiving end.

Thus, in the power conversion devices 10a and 10b of the embodiment, the desired power transmission can be continued and the power flow reversal can be performed without a high-quality highly reliable terminal-terminal communication.

Hereinabove, embodiments of the invention are described with reference to specific examples. However, the invention is not limited to these specific examples. For example, one skilled in the art may similarly practice the invention by appropriately selecting specific configurations of components such as the power converter, the control device, etc., from known art; and such practice is within the scope of the invention to the extent that similar effects can be obtained.

Also, combinations of any two or more components of the specific examples within the extent of technical feasibility also are within the scope of the invention to the extent that the spirit of the invention is included.

Furthermore, all power conversion devices practicable by an appropriate design modification by one skilled in the art based on the power conversion devices described above as embodiments of the invention also are within the scope of the invention to the extent that the spirit of the invention is included.

Also, various modifications and alterations within the spirit of the invention will be readily apparent to those skilled in the art, and all such modifications and alterations also should be seen as being within the scope of the invention.

Although several embodiments of the invention are described, these embodiments are presented as examples and are not intended to limit the scope of the invention. These novel embodiments may be implemented in other various forms, and various omissions, substitutions, and modifications can be performed without departing from the spirit of the invention. Such embodiments and their modifications are within the scope and spirit of the invention and are within the scope of the invention described in the claims and their equivalents.

The invention claimed is:

1. A control device controlling a power converter, the power converter being capable of being connected to a terminal of a direct current power transmission system transmitting power according to a current command value that is set, the control device comprising:

a first characteristic setter having a first characteristic preset, when the power converter is set at a power transmission end of the direct current power transmission system, the first characteristic outputs an output terminal voltage for the power converter, the output terminal voltage corresponding to a current of a current control based on a current command value set at a power receiving end of the direct current power transmission system, the output terminal voltage of the first characteristic monotonously decreasing with respect to the current of the current control.

2. The control device according to claim 1, wherein the first characteristic is linear.

3. The control device according to claim 1, wherein the first characteristic causes the output terminal voltage to be a maximum value when the current command value that may be set at the power receiving end is a minimum value.

4. The control device according to claim 1, further comprising:

a current controller performing at least a current control to track the current command value that may be set.

5. The control device according to claim 4, wherein
the current controller operates at a maximum value of the current command value that may be set when a startup command is received from a higher-level system commanding the direct current power transmission system.

6. The control device according to claim 4, wherein
the current controller performs a setting to a minimum value of the current command value that may be set when a power flow reversal command is received from a higher-level system commanding the direct current power transmission system.

7. A power conversion device, comprising:
a power converter mutually converting between an alternating current voltage and a direct current voltage; and
the control device according to claim 1.

* * * * *